Oct. 24, 1967   R. G. SMITH   3,348,694

STRAINER VALVE PLUG AND VALVE

Filed Feb. 21, 1966

INVENTOR.
RUSSELL G. SMITH
BY
*J. Warren Kinney, Jr.*
ATTORNEY

United States Patent Office 3,348,694
Patented Oct. 24, 1967

3,348,694
STRAINER VALVE PLUG AND VALVE
Russell G. Smith, Cincinnati, Ohio, assignor to Continental Manufacturing Company, Cincinnati, Ohio, a corporation of Ohio
Filed Feb. 21, 1966, Ser. No. 528,951
4 Claims. (Cl. 210—390)

ABSTRACT OF THE DISCLOSURE

The lined and tapered plug of the valve is axially bored to snugly receive an open-ended cylindrical strainer which is partly cut away at the up-stream side of the plug port to admit fluid and fluid-borne particles to the inside of the strainer. Heavier particles arrested by the strainer may accumulate within a normally closed bottom port formed in the valve body, which bottom port when opened, serves also to drain from the valve chamber a cleaning fluid to be injected through a side port of the valve body for flushing the screen while the valve is in closed condition. All adjustments, and access to the plug are located about a valve stem on the larger end of the valve plug, remote from the bottom drain port of the valve body.

---

The present invention relates to a straining valve, or a valve adapted to strain a fluid passed therethrough.

An object of the invention is to provide straining means in a plug-type valve so constructed that the straining means may be periodically cleaned or washed of foreign matter, without disassembling the valve.

Another object of the invention is to provide a valve plug for a valve of the character stated, which incorporates a strainer wholly supported by the plug and encased substantially wholly within the confines of the plug.

A further object of the invention is to provide a straining valve of the plug variety, which is simple and economical to manufacture and service.

Still another object is to provide an improved valve of the character stated, which embodies the advantages of compactness, reliable operation, and ease of cleaning.

The foregoing and other objects are attained by the means described herein and illustrated upon the accompanying drawing, in which.

Figure 1:
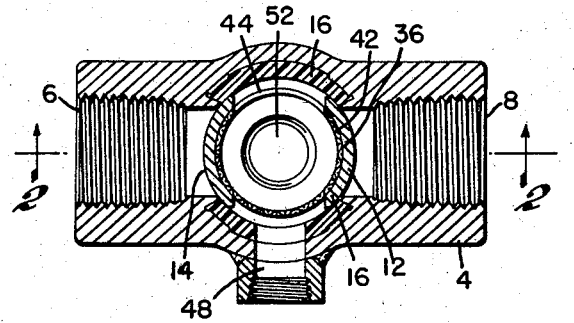
FIG. 1 is a cross-section taken on line 1—1 of FIG. 2.

The device comprises a valve body 4, preferably of metal, incorporating an inlet port 6 and an outlet port 8 internally threaded, or otherwise adapted for connection with pipes of a system for conveying a fluid under the control of the valve. The valve body is drilled or reamed transversely of the ports, to provide a chamber 10 in which may be rotatably supported the valve plug member 12. If desired, the outer wall 14 of the plug member, and the inner wall of chamber 10, may be complementarily tapered as shown, although in some instances these walls may be of right cylindrical formation.

By preference, though not of necessity, the chamber 10 is lined, sleeved, or internally ringed as at 16, with a gasket material designed to preclude leakage of fluid along the plug. A satisfactory material for the purpose is Teflon, or an equivalent substance.

Plug 12 may carry at its upper end a stem 18, whereby the plug may be rotated. The outer end of the stem may carry a suitable actuating handle 20, herein shown by way of example as a rod or bar, having an end applied to a cap 22 which is non-rotatably mounted upon the upper end of stem 18. The cap may carry a lug 24 for indicating a closed or open position of the valve, or for stopping rotation of the plug at said positions. If desired, the cap and handle 20 may be fixed to the stem by means of a screw 26, or otherwise.

Stem 18 is encircled by a bonnet 28 secured to the valve body preferably by means of screws or bolts 30; and interiorly of the bonnet may be disposed any suitable form of gasketing or sealing device 32, for precluding leakage of fluid, or entry of dirt, about stem 18. The characters 34 indicate pressure screws sometimes employed for maintaining the stem seal.

In accordance with the present invention, plug 12 is provided with a long cylindrical bore 36 open at the lower end 38 of the plug, and terminating near the base of stem 18, or near the top portion of the plug. The base of the bore is denoted by reference character 40. Bore 36 constitutes a chamber wholly within the plug, for snugly supporting an elongate cylindrical screen 42. The screen and its chamber preferably are concentric with the stem 18 and the outer wall of the plug.

Figure 2:
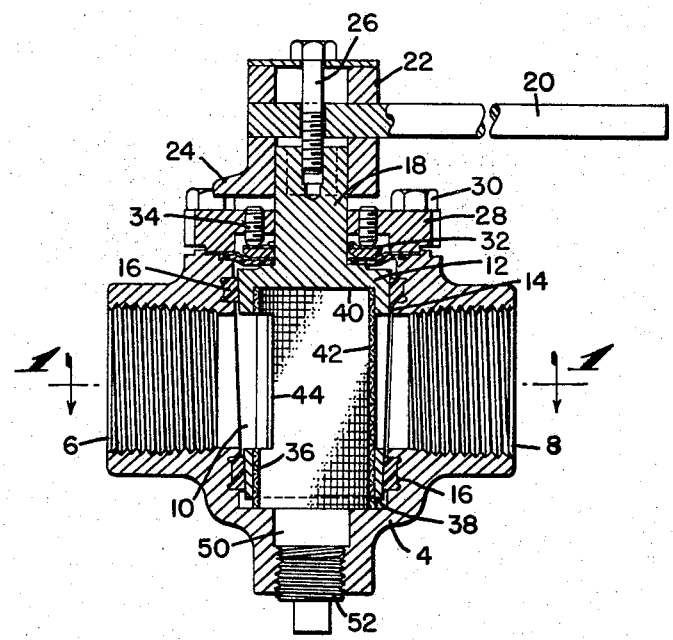
FIG. 2 is a vertical section taken on line 2—2 of FIG. 1.

At the inlet side of the plug, screen 42 may be apertured or cut away as at 44, to permit unrestricted flow of fluid from inlet port 6 into the confines of screen chamber 36, when the plug is rotated to open valve position as shown by FIG. 2. When the plug is rotated a quarter turn, as in FIG. 1, the solid portion of plug wall 14 blocks the flow of fluid through the valve. As will readily be understood, the valve when open according to FIG. 2, ensures the straining of all fluid passing from the inlet port 6 to outlet port 8, and any foreign matter screened out will adhere to that area of the screen which is in registry with the outlet port.

Due to the adherence of foreign matter to the screen, periodic cleaning or back-flushing of the screen is advisable. The means provided for this purpose may comprise a pair of cleaning ports 48 and 50, provided in the side of the valve body (FIG. 1), and in the bottom thereof (FIG. 2), respectively. The side port 48 is adapted for connection with a cleaning fluid, such as air or a liquid under pressure, which forcefully back-washes the clogged area of the screen when the valve is in closed position, FIG. 1. Foreign matter so dislodged from the screen gravitates through the open lower end of the screen chamber and is flushed out through bottom port 50, (plug 52 having been previously removed).

Upon completion of each flushing procedure, plugs such as 52 are tightly driven into both cleaning ports 48 and 50, thereby restoring the valve to normal service in a cleaned condition.

Whereas FIG. 2 shows the lower end of the screen extended beyond the lower end of plug 12, such extension of the screen is not required for effective operation. It may properly be considered that the screen is substantially wholly embraced within the confines of the valve plug. The screen preferably is replaceable by a new screen should the original one become ineffective as a result of corrosion or other impairment in use. The screen may be retained in proper position within chamber 36, either by frictional retention or with the use of mechanical means such as a solder connection or any appropriate form of fastener or retainer.

It is to be understood that various modifications and changes may be made in the structural details of the device, within the scope of the appended claims, without departing from the spirit of the invention.

What is claimed is:
1. A plug-type valve comprising in combination: a valve body having an inlet port, an outlet port, and a substantially cylindrical chamber intermediate said ports for accommodating a valve plug; a substantially cylindrical valve plug rotatable in the body chamber, said plug being hollow and having opposed ports at opposite ends of a diameter to register with the inlet and outlet ports of the valve body when the plug is rotated to open-valve position; and imperforate portions in the plug wall to close said body ports when the plug is rotated to a closed-valve position; and a screen covering one only of the plug ports, for straining foreign matter from a fluid passed through the inlet and outlet ports of the valve body in the open position of the valve; means for back-flushing the screen with the valve in closed position, said back-flushing means comprising a cleaning port in a side of the valve body for directing a cleaning fluid against the outside of the screen while the valve is in closed position, for dislodging foreign matter from the screen; and a bottom cleaning port in the body of the valve for draining out the cleaning fluid introduced through the cleaning port first mentioned.

2. The device as specified by claim 1, wherein the first-mentioned cleaning port is located in the valve body intermediate the inlet and outlet ports of said body, and positioned to register with that port of the plug which is screened; and wherein said bottom cleaning port is in the bottom of the valve body adjacent to the open lower end of the plug; said cleaning ports being closable when the valve is in service.

3. A plug-type valve comprising in combination: a valve body having an inlet port, an outlet port, and a substantially cylindrical chamber intermediate said ports for accommodating a valve plug; a substantially cylindrical valve plug rotatable in the body chamber coaxially therewith, said plug having a lower end bored longitudinally of the plug axis to provide a cylindrical screen chamber terminating near the top of the plug; a cylindrical screen fixed in the screen chamber of the plug; the plug having ports at opposite ends of the diameter to register with the inlet and outlet ports of the valve body when the plug is rotated to open-valve position; and solid portions in the plug wall to close said body ports when the plug is rotated to closed-valve position; the screen being cut away at that plug port which registers with the inlet port of the valve body when the plug is rotated to open-valve position, whereby fluid introduced through the body inlet port passes unimpeded into the screen chamber of the plug, but passes outwardly through the screen before entering the outlet port of the valve body; and means for back-fluishing the screen while the valve is closed, to dislodge from the screen any foreign matter accumulated therein during passage of fluid through the inlet and outlet ports of the valve body, wherein the back-flushing means comprises a cleaning port in a side of the valve body for directing a cleaning fluid against the outside of the screen while the valve is in closed position, and a second cleaning port in the body of the valve for draining out the cleaning fluid introduced through the first-mentioned cleaning port.

4. The device as specified by claim 3, wherein the first-mentioned cleaning port is located in the valve body intermediate the inlet and outlet ports of the said body, and positioned to register with that port of the plug which is screened; and wherein the second-mentioned cleaning port is in the valve body beneath the open lower end of the plug; said cleaning ports being closeable when the valve is in service.

References Cited
UNITED STATES PATENTS

| | | | |
|---|---|---|---|
| 427,029 | 4/1890 | Bardez | 210—391 X |
| 456,242 | 7/1891 | Ebert | 210—390 |
| 780,334 | 1/1905 | Freeman | 210—391 X |
| 805,237 | 11/1905 | Sears | 210—390 X |
| 808,910 | 1/1906 | Dunham | 210—390 |
| 1,672,946 | 6/1928 | Klell | 210—390 |
| 1,945,491 | 1/1934 | Lamort | 210—393 |
| 3,074,560 | 1/1963 | Kinney | 210—392 X |

FOREIGN PATENTS

| | | |
|---|---|---|
| 3,463 | 1/1879 | Germany. |
| 322,522 | 7/1920 | Germany. |

REUBEN FRIEDMAN, *Primary Examiner.*

J. ADEE, *Assistant Examiner.*